United States Patent [19]
Kawasaki

[11] Patent Number: 4,980,104
[45] Date of Patent: Dec. 25, 1990

[54] METHOD FOR PRODUCING HIGH DENSITY SIC SINTERED BODY

[75] Inventor: Shinji Kawasaki, Nagoya, Japan

[73] Assignee: NGK Insulators, Ltd., Japan

[21] Appl. No.: 295,355

[22] Filed: Jan. 10, 1989

[30] Foreign Application Priority Data

Jan. 19, 1988 [JP] Japan .................................. 63-7581

[51] Int. Cl.$^5$ .............................................. C04B 35/56
[52] U.S. Cl. ........................................ 264/65; 264/63; 264/66; 501/90
[58] Field of Search ................ 264/65, 66, 63; 501/90

[56] References Cited

U.S. PATENT DOCUMENTS

| | | |
|---|---|---|
| 4,041,117 | 9/1977 | Prochazka . |
| 4,455,385 | 6/1984 | Prochazka ............................ 501/90 |
| 4,517,305 | 5/1985 | Suzuki ................................... 501/90 |
| 4,668,452 | 5/1987 | Watanabe et al. ..................... 264/65 |
| 4,770,829 | 9/1988 | Yamada et al. ........................ 501/90 |

FOREIGN PATENT DOCUMENTS

| | | |
|---|---|---|
| 0071241 | 7/1982 | European Pat. Off. . |
| 52-6716 | 1/1977 | Japan . |
| 60-255972 | 12/1985 | Japan . |
| 2017070 | 9/1979 | United Kingdom . |

OTHER PUBLICATIONS

Journal of the American Ceramic Society, vol. 68, No. 8, Aug. 1985, pp. C191–C193, Columbus, OH, U.S.; T. Sakai et al.: "Hot Pressing of SiC with Additions of BaO and C", p. C192, col. 2, paragraph 3.

Primary Examiner—James Derrington
Attorney, Agent, or Firm—Parkhurst, Wendel & Rossi

[57] ABSTRACT

A high density SiC sintered body can be obtained by molding a mixture of two kinds of high temperature-type and low temperature-type silicon carbides together with sintering aids into a shaped article, primarily firing the shaped article, and subjecting the primarily sintered body to an HIP treatment.

4 Claims, 1 Drawing Sheet

METHOD FOR PRODUCING HIGH DENSITY SIC SINTERED BODY

Background of the Invention (a) Field of the Invention:

This invention relates to a method for producing a high strength and high density SiC sintered body.

(b) Related Art Statement:

In a method for producing a high density SiC sintered body, wherein a shaped article consisting of β-SiC containing B and C is primarily fired, and the primarily sintered body is subjected to an HIP treatment, when the primary firing is carried out at a high temperature, the SiC particle catches pores at the final stage of the firing, and grows extraordinarily to a size of several hundred microns, and hence the resulting SiC sintered body exhibits poor properties. Moreover, the pores caught in the interior of the extraordinarily grown up particle can not be removed by the HIP treatment and hence it is difficult to produce a high density SiC sintered body. When a primary firing is carried out at a low temperature in order to prevent the extraordinary grain growth, the resulting primarily sintered body does not have a satisfactorily high density and contains open pores, and hence even when the primarily sintered body is subjected to an HIP treatment, a high density SiC sintered body can not be obtained. That is, in order to obtain a high density SiC sintered body through an HIP treatment, a primary firing temperature must be strictly controlled within a narrow temperature range to produce a primarily sintered body containing no open pores and containing closed pores which remain in the grain boundary.

Based on the above described viewpoint, Japanese Patent Laid-open Application No. 60-255,672 has disclosed a method for producing an SiC sintered body having a high density of not less than 99.3% and a high strength of not less than 70 kg/mm², wherein the composition and treating condition of a conventional SiC powder containing B and C as a sintering aid are strictly limited as follows: the amount of B: 0.2–0.5% by weight, the amount of C: 0.5–8% by weight, the primary firing condition: 1,950°–2,150° C., the HIP treatment condition: 1,850°–1,980° C. and at least 100 atm.

Further, Japanese Patent Laid-open Application No. 52-6,716 has disclosed a method for producing an SiC sintered body having a composite structure, which consists of platy α-SiC particles and granular β-SiC particles having a particle size smaller than that of the platy α-SiC particles, and containing pores distributed in the grain boundary, under normal pressures, wherein β-SiC containing B and C is mixed with 0.05–5% by weight of α-SiC having a particle size of not smaller than 2 times that of the β-SiC. In the sintered body, extraordinary grain growth is effectively suppressed and the amount of sintering aid and the firing condition are limited within a relatively wide range.

However, in the technique disclosed in Japanese Patent Laid-open Application No. 60 255,672, the composition range, primary firing condition range and HIP treatment condition range are narrow, and hence these conditions are difficult to be controlled. Particularly, it is difficult to produce a large amount of large size homogeneous SiC sintered bodies on a commercial scale, and moreover the resulting SiC sintered bodies have a high density of not less than 99.3%, but have a strength of 70 kg/mm² which is not satisfactorily high.

In technique disclosed in Japanese Patent Laid-open Application No. 52-6,716, the condition ranges for the production of SiC sintered body are wide, and the resulting SiC sintered body has a composite structure consisting of platy α-SiC particles, which is effective for giving high strength and high toughness to the resulting SiC sintered body, and granular β-SiC particles. However, the SiC sintered body having the composite structure consisting of platy α-SiC particles and granular β-SiC particles has a density lower than that of an SiC sintered body produced from a single component of β-SiC powder. That is, an SiC sintered body having high density, strength and toughness, which has been recently demanded in an increasing amount, was not able to be obtained by the technique of Japanese Patent Laid-open Application No. 52-6,716. Moreover, the SiC sintered body disclosed in this Japanese patent application, which is produced under normal pressures, is low in density and contains open pores, and hence is not suitable to be converted into a high density SiC sintered body by an HIP treatment.

SUMMARY OF THE INVENTION

The object of the present invention is to provide a method which does not experience the above described problems and which can produce a high density and high strength SiC sintered body easily and stably under a production condition having a wide controlling range.

The feature of the present invention lies in a method for producing a high density SiC sintered body, wherein a shaped article consisting of SiC powder and a sintering aid is fired and the sintered shaped article is subjected to a hot isostatic press treatment, the improvement comprises molding into a shaped article a starting powdery mixture, which consists of 90.0–99.8% by weight of an SiC raw material mixed powder, 0.1–5.0% by weight, calculated as boron, of boron or a boron-containing compound used as one component of sintering aid, and 0.1–5.0% by weight, calculated as carbon, of carbon or a carbon-formable organic compound used as another component of sintering aid. The SiC raw material mixed powder consists of 95.0–99.9% by weight of low temperature-type SiC powder consisting of at least one of 3C and 2H polytype silicon carbides and 5.0–0.1% by weight of high temperature-type SiC powder consisting of at least one of 6H, 4H and 15R polytype silicon carbides having an average particle size of less than two times that of the above described 3C and 2H polytype silicon carbides. The shaped article is primarily fired at a temperature of 1,900°–2,300° C. under vacuum or under an inert gas atmosphere, and then subjected the to a hot isostatic press treatment at a temperature of 1,800°–2,200° C. under a pressure of at least 100 atmospheres in an inert gas atmosphere.

DESCRIPTION OF THE PREFERRED EMBODIMENT

Figure 1:
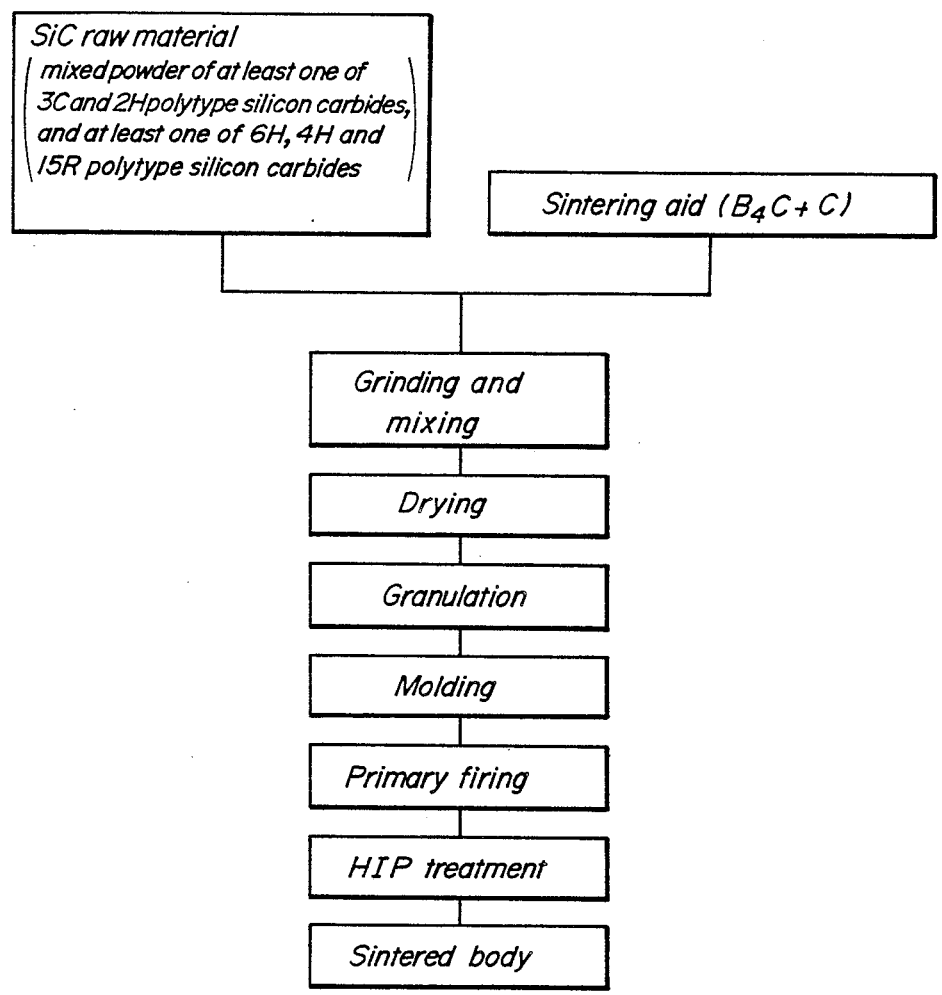
FIG. 1 is a flow chart illustrating one embodiment of the production step of the high density SiC sintered body of the present invention.

According to the present invention, two kinds of SiC powders having specifically limited compositions and particle sizes are used, whereby a primarily sintered body, which has a composite structure consisting of platy α-SiC particles having a high aspect ratio and granular β-SiC particles having a size smaller than that of the α-SiC particle, has no open pores, has closed pores remaining in the grain boundary and has a relatively high density, can be obtained. Accordingly, when the primarily sintered body is subjected to an HIP treatment, a high strength SiC sintered body having the above described composite structure and having a high density of at least 98% can be easily and stably obtained. That is, according to the present invention, there can be obtained by an HIP treatment a high density SiC sintered body having a composite structure consisting of platy α-Sic particles having a high aspect ratio, said platy α-SiC particle having been considered to be impossible to be made into a high density sintered body by an HIP treatment, and granular β-SiC particles having a size smaller than that of the platy α-SiC particles. Moreover, according to the present invention which can develop a synergistic effect of the combination use of SiC particles having given compositions and sizes and the HIP treatment, the composition, primary firing condition and HIP treatment condition for obtaining the above described sintered body can be selected within a wide range. Therefore, the present invention is very valuable for industrial purposes.

The SiC powder consisting of at least one of 3C and 2H polytype silicon carbides is a low temperature-type SiC powder synthesized at a temperature of substantially not higher than 2,000° C. As the method for producing the 3C and 2H polytype silicon carbides, there are known a reduction and carbonization method of silica and the like. The SiC powder consisting of at least one of 6H, 4H and 15R polytype silicon carbides is a high temperature-type SiC powder synthesized at a temperature of substantially not lower than 2,000° C. As the method for producing the high temperature-type 6H, 4H and 15R polytype silicon carbides, the Acheson process is generally used. Further, the 6H, 4H and 15R polytype silicon carbides can be synthesized by heating the 3C and 2H polytype silicon carbides at a high temperature of not lower than 2,000° C.

In the present invention, 5.0–0.1% by weight of high temperature-type SiC powder consisting of at least one of 6H, 4H and 15R polytype silicon carbides is mixed with 95.0–99.9% by weight of low temperature-type SiC powder consisting of at least one of 3C and 2H polytype silicon carbides to form an SiC raw material mixed powder. The reason why the amount of the high temperature-type SiC powder consisting of at least one of 6H, 4H and 15R polytype silicon carbides to be mixed with low temperature-type SiC powder consisting of at least one of 3C and 2H polytype silicon carbides is limited to 5.0–0.1% by weight is that, when the amount of the high temperature-type SiC powder exceeds 5.0% by weight, the resulting SiC sintered body is low in the aspect ratio of the resulting platy α-SiC particle and is poor in the properties, and when the amount is less than 0.1% by weight, the effect of the use of at least one of 6H, 4H and 15R polytype silicon carbides is poor.

In the present invention, the reason why the particle size of the high temperature-type SiC powder consisting of at least one of 6H, 4H and 15R polytype silicon carbides is limited to less than 2 times that of the low temperature-type SiC powder consisting of at least one of 3C and 2H polytype silicon carbides, is that when the particle size of the high temperature-type SiC powder of 6H, 4H or 15R polytype SiC is not less than 2 times that of the low temperature-type SiC powder of 3C or 2H polytype SiC, the primarily sintered body contains a large amount of open pores remaining therein, and hence the primarily sintered body can not be converted into a high density SiC sintered body even when is subjected to an HIP treatment.

The reason why the amount of boron to be used as one component of sintering aid in the present invention is limited to 0.1–5.0% by weight based on the total amount of the SiC raw material mixed powder and the boron and carbon components of sintering aid is that when the amount of boron is less than 0.1% by weight, the effect of boron does not appear and a high density SiC sintered body can not be obtained. While, when the amount of boron is more than 5.0% by weight, a large amount of boron remains in the grain boundary and the high temperature characteristic of the resulting SiC sintered body is poor. Further, the reason why the amount of carbon used as another component of sintering aid is limited to 0.1–5.0% by weight based on the total amount of the SiC raw material mixed powder and the boron and carbon components of sintering aid is that when the amount of carbon is less than 0.1% by weight, an $SiO_2$ film forms on the SiC surface and can not be removed, and an SiC sintered body having a satisfactorily high density can not be obtained. While, when the amount of carbon exceeds 5.0% by weight, a large amount of free carbon remains in the resulting SiC sintered body and the SiC sintered body exhibits poor properties.

The reason why the temperature of the primary firing, which should be carried out before the HIP treatment, is limited to 1,900°–2,300° C. is that, when the temperature is lower than 1,900° C., open pores remain in the primarily sintered body, and the primarily sintered body can not be converted into a high density SiC sintered body even when the primarily sintered body is subjected to an HIP treatment. While, when the primary firing temperature is higher than 2,300° C., the surface of the primarily sintered body becomes rough due to the decomposition of SiC. The reason why the HIP treatment is carried out at a temperature of 1,800°–2,200° C. under a pressure of at least 100 atmospheres is as follows. When the HIP treatment temperature is lower than 1,800° C., an SiC sintered body having a satisfactorily high density can not be obtained. While, when the temperature exceeds 2,200° C., the operation cost for carrying out the HIP treatment is too high, and such HIP treatment is not a reasonable operation. When the HIP treatment pressure is less than 100 atmospheres, a satisfactorily high density SiC sintered body can not be obtained. Further, when the high temperature-type SiC powder consisting of at least one of 6H, 4H and 15R polytype silicon carbides has substantially the same particle size as that of the low temperature-type SiC powder consisting of at least one of 3C or 2H polytype silicon carbides, they can be homogeneously mixed with each other, and a good result can be obtained.

The method for producing the high density SiC sintered body of the present invention will be explained hereinafter.

FIG. 1 is a flow chart illustrating one embodiment of the production step of the high density SiC sintered body of the present invention.

In the production of the high density SiC sintered body, there are used a high temperature-type SiC powder consisting of at least one of 6H, 4H and 15R polytype silicon carbides, which are produced by the Acheson process and have an average particle size of not larger than 5 μm, a low temperature-type SiC powder consisting of at least one of 3C and 2H polytype silicon carbides, which are produced by the reduction and carbonization method and have an average particle size of not larger than 5 μm, and boron and carbon as sintering aids.

In general, a mixture of powders of 6H, 4H and 15R polytype silicon carbides is used as a high temperature-type SiC powder consisting of at least one of 6H, 4H and 15R polytype silicon carbides, and a mixture of powders of 3C and 2H polytype silicon carbides is used as a low temperature-type SiC powder consisting of at least one of 3C and 2H polytype silicon carbides. Chemical compositions of one embodiment of the high temperature-type SiC powder and one embodiment of the low temperature-type SiC powder are shown in the following Table 1.

TABLE 1

| Chemical composition (wt %) | | Mixture of 6H, 4H and 15R polytype silicon carbides | Mixture of 3C and 2H polytype silicon carbides |
|---|---|---|---|
| Total | Si | 69.02 | 69.24 |
| Free | $SiO_2$ | 0.80 | 0.36 |
| Free | Si | 0.02 | 0.01 |
| Free | C | 0.354 | 0.36 |
| | O | 1.14 | 0.88 |
| | Al | 0.009 | 0.067 |
| | Fe | 0.063 | 0.040 |
| | Ca | 0.021 | 0.031 |
| | Mg | 0.005 | 0.016 |
| | K | 0 | 0.001 |
| | Na | 0.007 | 0.002 |
| | Cu | 0.005 | 0.002 |
| | Ti | 0.022 | 0.005 |
| | N | — | 0.17 |

Then, given amounts of each SiC raw material powder and $B_4C$ and C used as sintering aids are ground and mixed with each other by using isopropyl alcohol in a wet type ball mill. The resulting powdery raw material mixture is once dried and then granulated. The granular raw material mixture is preliminarily molded, and the preliminarily shaped article is molded into a given shape by means of a hydrostatic press. Then, the resulting shaped article is primarily fired at a temperature of 1,900°–2,300° C. under vacuum or under an inert gas atmosphere, and the primarily sintered body is subjected to a hot isostatic press (HIP) treatment at a temperature of 1,800°–2,200° C. under a pressure of at least 100 atmospheres in an inert gas atmosphere, to obtain a high density SiC sintered body.

The following examples are given for the illustration of this invention and are not intended as limitations illustrations thereof.

EXAMPLE

Powder of a high temperature-type SiC raw material consisting of a mixture of 6H, 4H and 15R polytype silicon carbides, which was the same mixture as that described in Table 1 and had an average particle size of 0.42 μm, and powder of a low temperature-type SiC raw material consisting of a mixture of 3C and 2H polytype silicon carbides, which was the same mixture as that described in Table 1 and had an average particle size of 0.45 μm were mixed together with $B_4C$ (boron carbide) and C (carbon black) used as sintering aids in a mixing ratio shown in Table 2 by using isopropyl alcohol in a wet type ball mill, and the resulting homogeneous mixture was dried and then granulated. The granulated mixture was preliminarily molded into a shaped article, and the preliminarily shaped article was formed into a square plate having a dimension of 60×60×6 mm by means of a hydrostatic press of 3 ton/$cm^2$. Then, the resulting square plate was subjected to a primary firing in vacuum under the condition shown in Table 2. The resulting primarily sintered square plate was further subjected to an HIP treatment under the condition shown in Table 2 to obtain a sintered body of examples of the present invention or of comparative examples. In Comparative examples 5 and 6, powder of a mixture of 6H, 4H and 15R polytype silicon carbides, which had an average particle size of 1.5 μm, was used as a high temperature-type SiC raw material powder.

The density and open porosity of the sintered bodies before and after the HIP treatment were measured by the Archimedes' method, whereby their densities were evaluated. Further, the four-point bending test of the sintered bodies before and after the HIP treatment was effected at room temperature according to JIS R 1601 (Test method for bending strength of fine ceramics), whereby their strength at room temperature was evaluated. Further, the $K_{IC}$ of the HIP treated sintered body was measured at room temperature by the Chevron notch method, whereby the toughness of the HIP treated sintered body was evaluated, and further the ground-etched surface of the HIP treated sintered body was observed by a microscope, whereby the development of extraordinary grain growth was examined. The obtained results are shown in Table 2.

TABLE 2

| | SiC raw material | | Sintering aid | | Primary firing condition | | Primarily sintered body | |
|---|---|---|---|---|---|---|---|---|
| | Mixture of 3C and 2H polytype silicon carbides (g) | Mixture of 6H, 4H and 15R polytype silicon carbides (g) | $B_4C$ (g) | C (g) | Temperature (°C.) | Hours (h) | Density (g/$cm^3$) | Open porosity (%) |
| Comparative Example 1 | 100 | 0 | 1 | 2 | 2,100 | 1 | 3.08 | <0.2 |
| Comparative Example 2 | 99.99 | 0.01 | " | " | " | " | 3.06 | <0.2 |
| Example 1 | 99.9 | 0.1 | " | " | " | " | 3.04 | <0.2 |
| Example 2 | 99.0 | 1.0 | " | " | " | " | 3.02 | <0.2 |
| Example 3 | 97.0 | 3.0 | " | " | " | " | 2.98 | <0.2 |
| Example 4 | 95.0 | 5.0 | " | " | " | " | 3.00 | <0.2 |
| Comparative Example 3 | 90.0 | 10.0 | " | " | " | " | 3.04 | <0.2 |
| Comparative | 0 | 100 | " | " | " | " | 3.10 | <0.2 |

TABLE 2-continued

| | | | | | | | | |
|---|---|---|---|---|---|---|---|---|
| Example 4 | | | | | | | | |
| Comparative Example 5 | 99.0 | 1.0 | " | " | " | " | 2.82 | 10.8 |
| Comparative Example 6 | 95.0 | 5.0 | " | " | " | " | 2.76 | 12.1 |
| Comparative Example 7 | 99.0 | 1.0 | 0 | " | " | " | 2.25 | 28.8 |
| Comparative Example 8 | " | " | 1 | 0 | " | " | 2.48 | 21.1 |
| Comparative Example 9 | " | " | " | 2 | 1,800 | " | 2.38 | 24.3 |
| Example 5 | " | " | " | " | 2,000 | " | 2.95 | 0.3 |
| Example 6 | " | " | " | " | 2,200 | " | 3.05 | <0.2 |
| Comparative Example 10 | " | " | " | " | 2,100 | " | 3.02 | <0.2 |
| Example 7 | " | " | " | " | " | " | " | " |
| Example 8 | " | " | " | " | " | " | " | " |
| Comparative Example 11 | " | " | " | " | " | " | " | " |
| Example 9 | " | " | " | " | " | " | " | " |

| | HIP treatment condition | | | HIP treated body | | | |
|---|---|---|---|---|---|---|---|
| | Temperature (°C.) | Pressure (atm) | Hours (h) | Density (g/cm³) | Strength at room temperature (MPa) | $K_{IC}$ (MPam$^{\frac{1}{2}}$) | Extraordinary grain growth |
| Comparative Example 1 | 2,000 | 2,000 | 2 | 3.10 | 480 | 2.8 | 2.8 |
| Comparative Example 2 | " | " | " | 3.09 | 490 | 2.8 | 2.8 |
| Example 1 | " | " | " | 3.18 | 870 | 3.2 | none |
| Example 2 | " | " | " | 3.19 | 950 | 3.5 | none |
| Example 3 | " | " | " | 3.19 | 900 | 3.4 | none |
| Example 4 | " | " | " | 3.19 | 850 | 3.3 | none |
| Comparative Example 3 | " | " | " | 3.18 | 670 | 2.7 | none |
| Comparative Example 4 | " | " | " | 3.16 | 580 | 2.6 | none |
| Comparative Example 5 | " | " | " | 2.84 | — | — | none |
| Comparative Example 6 | " | " | " | 2.77 | — | — | none |
| Comparative Example 7 | " | " | " | 2.28 | — | — | none |
| Comparative Example 8 | " | " | " | 2.54 | — | — | none |
| Comparative Example 9 | " | " | " | 2.46 | — | — | none |
| Example 5 | " | " | " | 3.19 | 940 | 3.5 | none |
| Example 6 | " | " | " | 3.18 | 930 | 3.4 | none |
| Comparative Example 10 | 1,700 | " | " | 3.02 | 570 | 2.6 | none |
| Example 7 | 1,900 | " | " | 3.19 | 920 | 3.5 | none |
| Example 8 | 2,200 | " | " | 3.19 | 940 | 3.5 | none |
| Comparative Example 11 | 2,000 | 50 | " | 3.05 | 620 | 2.7 | none |
| Example 9 | " | 500 | " | 3.18 | 890 | 3.3 | none |

As seen from the results shown in Table 2, when the amount of the high temperature-type SiC powder consisting of a mixture of 6H, 4H and 15R polytype silicon carbides is less than 0.5% by weight (Comparative examples 1 and 2), the primarily sintered body contains extraordinarily grown up SiC particles, and hence the HIP treated sintered body does not have a satisfactorily high density, and further, exhibits poor strength and $K_{IC}$. While, when the amount of the high temperature-type SiC powder consisting of a mixture of 6H, 4H and 15R polytype silicon carbides exceeds 5.0% by weight (Comparative examples 3 and 4), although SiC particles are not extraordinarily grown up in the primarily sintered body, the aspect ratio of α-SiC particles is low in the primarily sintered body, and the HIP treated sintered body has low strength and low $K_{IC}$ value. When the average particle size of the high temperature-type SiC powder consisting of a mixture of 6H, 4H and 15R polytype silicon carbides is not less than two times that of the low temperature-type SiC powder consisting of a mixture of 3C and 2H polytype silicon carbides (Comparative examples 5 and 6), the primarily sintered body has low density and contains a large amount of open pores remaining therein, and hence even when the primarily sintered body is subjected to an HIP treatment, a sintered body having high density can not be obtained. When the addition amount of $B_4C$ is less than 0.1% by weight (Comparative example 7) or the addition amount of C is less than 0.1% by weight (Comparative example 8) or the primary firing temperature is lower than 1,900° C. (Comparative example 9), the primarily sintered body has low density and contains a large amount of open pores remaining therein, and hence the primarily sintered body can not be converted into a high density sintered body even when subjected to an HIP treatment. When the HIP treatment temperature is lower than 1,800° C. (Comparative example 10) or the HIP treatment pressure is lower than 100 atmospheres (Comparative example 11), the primarily sintered body can not be converted into a sintered body having a satisfactorily high density by the HIP treatment, and the HIP treated sintered body is low in the strength and $K_{IC}$ value. As described above, it can be seen from Table 2, that the SiC sintered bodies in Examples 1-9, which satisfy the conditions defined in the present invention, are higher in density (i.e., at least 98% based on the theoretical density of SiC, namely, 3.21 g/cm$^3$) and strength than the SiC sintered bodies in Comparative examples 1-11, which do not satisfy the conditions defined in the present invention. Moreover the sintered bodies of Examples 1-9 are higher in $K_{IC}$ value than the SiC sintered bodies of Comparative examples 1-11, and also exhibit high toughness.

As described above, according to the present invention, a given mixture of SiC powders is primarily fired to produce a primarily sintered body, and the primarily sintered body is subjected to an HIP treatment, whereby a high density SiC sintered body can be easily and stably obtained with the use of a wide composition range, wide primary firing condition range and wide HIP treatment condition range. Moreover, the SiC sintered body obtained in the present invention has composite structure consisting of a platy $\alpha$-SiC particles having a high aspect ratio and granular $\beta$-SiC particles, which is smaller in the size than the $\alpha$-SiC particles. Hence, the SiC sintered body obtained in the present invention has a density higher than the density of an SiC sintered body consisting only of $\alpha$-SiC or $\beta$-SiC, and also has high mechanical strength.

What is claimed is:

1. A method for producing a high density SiC sintered body, comprising:

molding a shaped article from a starting powdery mixture consisting of
  (a) 90.0-99.8 wt % of an SiC raw material mixed powder consisting of
    (i) 95.0-99.9 wt. % of a low temperature SiC powder consisting of at least one of 3C and 2H polytype silicon carbides, and
    (ii) 0.1-5.0 wt % of a high temperature SiC powder consisting of at least one of 6H, 4H and 15R polytype silicon carbides having an average particle size of less than two times that of said low temperature SiC powder;
  (b) 0.1-5.0 wt %, calculated as boron, of boron or a boron-containing compound used as one component of a sintering aid; and
  (c) 0.1-5.0 wt %, calculated as carbon, of carbon or a carbon-formable organic compound used as the other component of the sintering aid;
primarily sintering said shaped article at a temperature of 1,900°-2,300° C. under vacuum or under an inert gas atmosphere; and
subjecting the primarily sintered body to a hot isostatic press treatment at a temperature of 1,800°-2,200° C. under a pressure of at least 100 atmospheres in an inert gas atmosphere.

2. The method of claim 1, wherein said high density SiC sintered body consists of platy $\alpha$-SiC particles having a high aspect ratio and granular $\beta$-SiC particles having a smaller particle size than said platy $\alpha$-SiC particles.

3. The method of claim 1, wherein said high density SiC sintered body is substantially free of open pores, and includes closed pores in grain boundaries thereof.

4. The method of claim 1, wherein said high density SiC sintered body has a relative density of at least 98%.

* * * * *